United States Patent [19]

Noguchi

[11] Patent Number: 5,619,297
[45] Date of Patent: Apr. 8, 1997

[54] CAMERA

[75] Inventor: Yukio Noguchi, Omiya, Japan

[73] Assignee: Fuji Photo Optical Ltd., Saitama, Japan

[21] Appl. No.: 519,421

[22] Filed: Aug. 25, 1995

[30] Foreign Application Priority Data

Aug. 29, 1994 [JP] Japan .................................. 6-203628

[51] Int. Cl.$^6$ .................................................. G03B 17/38
[52] U.S. Cl. .......................................... 396/201; 396/266
[58] Field of Search .................................. 354/486, 266, 354/268, 288

[56] References Cited

U.S. PATENT DOCUMENTS

| | | | |
|---|---|---|---|
| 4,247,188 | 1/1981 | Kobori | 354/266 |
| 4,547,054 | 10/1985 | Bridges | 354/268 |
| 4,866,470 | 9/1989 | Arai et al. | 354/288 |
| 5,210,560 | 5/1993 | Labaziewicz | 354/268 |

FOREIGN PATENT DOCUMENTS

| | | |
|---|---|---|
| 61-129 | 1/1986 | Japan . |
| 5-188437 | 7/1993 | Japan . |
| 7-219014 | 8/1995 | Japan . |

*Primary Examiner*—Russell E. Adams
*Attorney, Agent, or Firm*—Sixbey, Friedman, Leedom & Ferguson, P.C.; David S. Safran

[57] ABSTRACT

A camera has a camera body being made of an electro-conductive material and a plurality of windows for light-projection or a light intake thereon. At least one of covering members for the windows includes an exposed part being exposed toward an outside of the camera and a hidden part being located in an inside of the camera. A first electrode is attached to the exposed part and a second electrode is attached to the hidden part. When a finger obstructs the window, a detecting means detects a finger obstruction by comparing the electrostatic capacity at the first electrode with that at the second electrode relatively. Then, warning is generated for indicating the finger obstruction by a warning generating means.

13 Claims, 8 Drawing Sheets

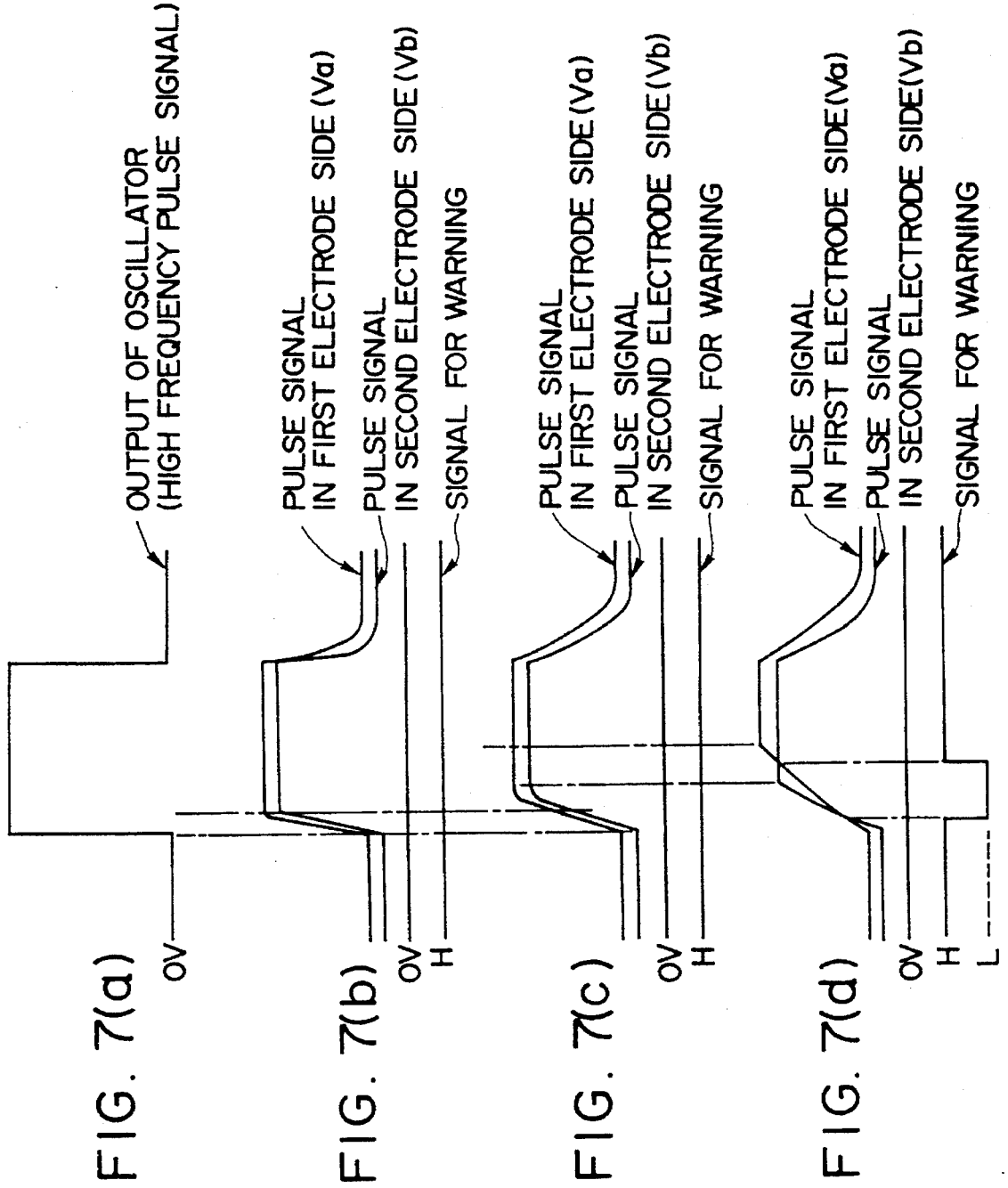

CAMERA

BACKGROUND OF THE INVENTION

1. Field of the Invention

The present invention relates to a camera and more particularly to a camera which prevents a failure in photographing caused by incorrectly holing the camera.

2. Description of the Related Art

A compact camera using a roll of 35 mm film is provided with an automatic electric flash equipment which automatically emits a strobe light in the dark, an AF mechanism which automatically performs focusing with half depression of a shutter release button, and an AE mechanism which automatically controls an exposure and the like, so that a beginner can easily take a picture.

In the above-described camera, it often happens that a strobe light emitting part, a taking lens, windows for automatic focusing, etc. are blocked or touched by a finger (Hereinafter, this is expressed as "finger obstruction"). That is, the failure in photographing is mostly caused by this finger obstruction.

For example, if the strobe light emitting part is obstructed by the finger at the time of photographing, a printed photograph is to be underexposure, and if the taking lens is obstructed, the finger is printed on the photograph. Moreover, when windows for automatic focusing or automatic exposure are obstructed by the finger, an accurate focusing or an exposure control cannot be carried out.

There are two cameras disclosed in Japanese Utility Model Application Laid-open No. 61-129 and Japanese Patent Application Laid-open No. 5-188437, which prevent a failure in photographing caused by the finger obstruction. Above-mentioned cameras aim to prevent a strobe light emitting part from being obstructed by the finger, and fine irregular portions and projections are formed around the strobe light emitting part so as to sense the finger obstruction. However, the irregular portions and projections are formed on an external surface of the camera, so there is a restriction in designing the external appearance of the camera, and also there is a disadvantage in designing the camera to be compact.

Under the above-described circumstances, the camera of Japanese Patent Application Laid-open No. 6-10064 is provided with a touch sensor thereon, which electrically detects the finger obstruction which is caused by incorrect holding. The touch sensor is, for example, an electrostatic capacity type which is provided in the vicinity of a strobe light emitting window so as to detect the finger obstruction. Accordingly, a mechanically movable portion is not required, so that the designing of the external appearance is not restricted, and the camera has a durability. In this camera, the detection of the finger obstruction is performed by detecting the change of the electrostatic capacity at a detecting electrode. However, the electrostatic capacity at the detecting electrode is changed only if the finger gets close to the detecting electrode. As a result, there is a problem in that the finger obstruction is detected by mistake.

Furthermore, if the camera body is covered with a decoration face plate which is made of a metal having an electro-conductivity such as aluminum, titanium, nickel alloy and the like, the detecting electrode is located in such a manner to be close to or contact with the face plate. Therefore, the electrostatic capacity at the detecting electrode is changed by holding the camera body. As a result, there is a disadvantage in that the finger obstruction is frequently detected by mistake.

Moreover, in the case that the camera body is made of an electro-conductive material such as aluminum die casting and the like, the detecting electrode is located in such a manner to be close to or contact with the camera body. Therefore, if the finger contacts with a metal part such as a screw, etc. which are exposed to the outside, the electrostatic capacity at the detecting electrode is similarly changed even though the camera body is covered with an insulating face plate. Consequently, the finger obstruction is detected by mistake.

SUMMARY OF THE INVENTION

The present invention has been developed in view of the above-described circumstances, and has its aim the provision of a camera which prevents an incorrect detection of a finger obstruction.

To achieve the above-mentioned objects, a camera having a camera body being made of an electro-conductive material and a plurality of windows for light-projection or a light intake comprises, a first electrode which is attached to an insulating member being provided in a vicinity of at least one of plural windows in such a manner that the first electrode is located inside the camera body, a second electrode which is attached to an insulating member being provided on an inner surface of the camera body in such a manner that the second electrode is located in a vicinity of the first electrode, a detecting means for detecting a finger obstruction by comparing electrostatic capacity at the first electrode with electrostatic capacity at the second electrode relatively, and a warning generating means for generating a warning when the detecting means detects the finger obstruction.

According to the present invention, when the finger obstructs the window for light-projection or a light intake, the electrostatic capacities at the first and second electrode are changed by the effect of user's electrostatic capacity via the insulator. At this time, the electrostatic capacity at the first electrode is changed much, on the other hand, the electrostatic capacity at the second electrode is changed very little. Therefore, the finger obstruction is detected by comparing the electrostatic capacity at the first electrode with that at the second electrode relatively. When the user holds the camera without the finger obstruction, the electrostatic capacity at the first electrode is nearly equal to that at the second electrode. Therefore, the finger obstruction is not detected. As a result, the finger obstruction is correctly detected.

In a preferred embodiment of the invention, the detecting means comprises, a pulse generating means, a first delaying means for delaying a pulse being generated by the pulse generating means in accordance with an electrostatic capacity at the first electrode, a second delaying means for delaying a pulse being generated by the pulse generating means in accordance with an electrostatic capacity at the second electrode, and a means for detecting a finger obstruction in accordance with a phase difference of a pulse being outputted from the first delaying means from a pulse being outputted from the second delaying means.

Here, when the user holds the camera without the finger obstruction, the phase of the pulse signal in the second electrode side is equal or slightly delayed in comparison with that in the first electrode side. When the user holds the camera with the finger obstruction, the phase of the pulse signal in the first electrode side is delayed in comparison with that in the second electrode. As a result, the finger obstruction is correctly detected by use of the phase difference.

Further, in a preferred embodiment of the invention, the first and second electrodes are integrated in a covering member for the windows for light-projection or a light intake, which has an electro-conductivity. As a result, the first and second electrodes are easily attached to the camera.

Furthermore, in a preferred embodiment of the invention, the first and second electrodes are integrated in an insulating inner frame member which is secured to an inner surface of the camera body so as to eliminate the static electricity in an outside of the camera body, which gives no good effect on electric circuits within the camera body. As a result, the first and second electrode are easily attached to the camera.

Still further, in a preferred embodiment of the invention, the first and second electrodes are integrated in a flexible printed circuit board. As a result, the first and second electrodes are easily attached in the camera.

BRIEF DESCRIPTION OF THE DRAWINGS

The exact nature of this invention, as well as other objects and advantages thereof, will be readily apparent from consideration of the following specification relating to the accompany drawings, in which like reference characters designate the same or similar parts throughout the figures thereof and wherein:

FIGS. 7(a), 7(b), 7(c) and 7(d) are wave form charts of a phase difference detecting circuit;

DESCRIPTION OF THE PREFERRED EMBODIMENT

Detailed description will hereunder be given of the preferred embodiment of a camera according to the present invention with reference to the accompanying drawings.

Figure 1:
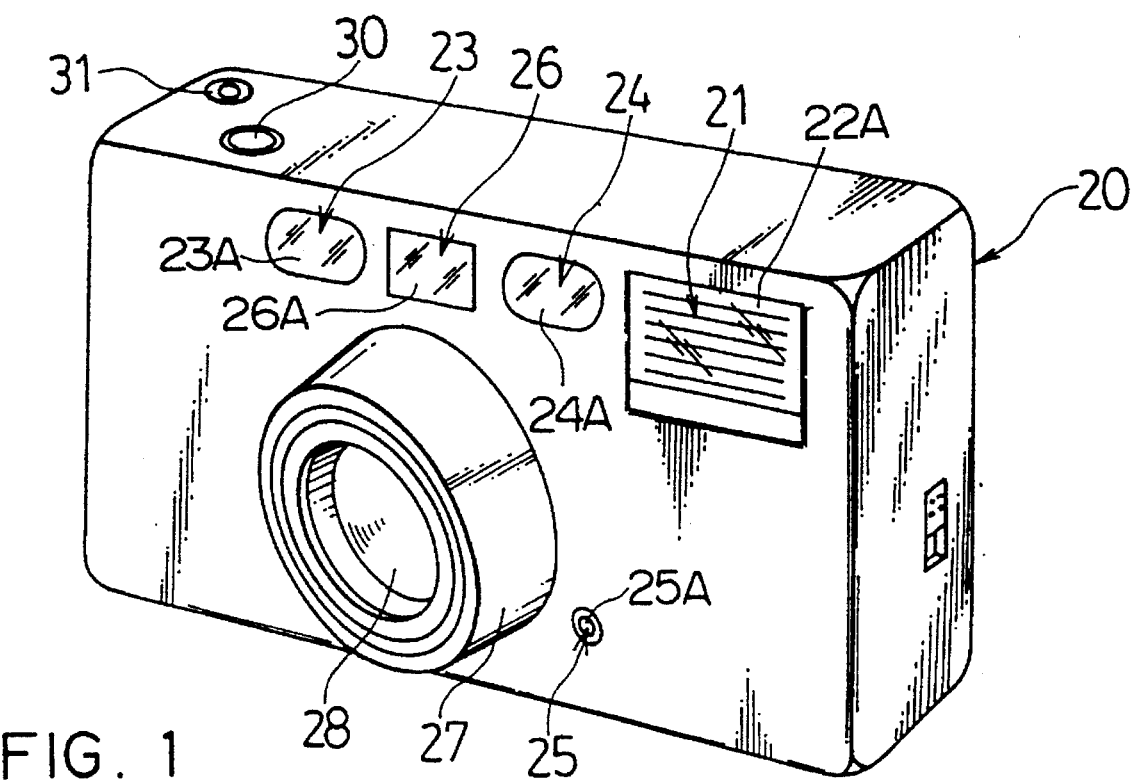
FIG. 1 is a perspective view illustrating the external appearance of a camera according to the present invention.

FIG. 1 is an external appearance of the camera according to the present invention. A camera body 20 in FIG. 1 is made of an electro-conductive material such as aluminum, titanium, nickel, etc. An exposed part 22A of a diffusion plate 22 (covering member) for a strobe light emitting part 21, light-projection window 23 and a light intake window 24 for automatic focusing, a photometric window 25 for measuring a subject brightness, a finder 26, a taking lens 28 supported by a lens barrel 27, and like are provided on a front surface of the camera body 20. A shutter release button 30 which is half pressed for automatic focusing and pressed completely for shutter releasing and, a main switch 31 of the camera are provided on an upper surface of the camera body 20. When the subject brightness being measured through the photometric window 25 is low, the strobe light emitting part 21 of an electric flash equipment which is integrated within the camera body 20 automatically emits strobe light.

The strobe light emitting part 21 mainly comprises the diffusion plate 22 which is an insulating member such as plastic and like, a xenon tube 33 for emitting strobe light and a reflection plate 34 for reflecting strobe light forward. The diffusion plate 22 is attached to the camera body 20 in such a manner that the exposed part 22A of the diffusion plate 22 is exposed from a opening 20A of the camera body 20. Also, a hidden part 22C is extended from the lower part of the diffusion plate 22. When the diffusion plate 22 is attached to the camera body 20, the hidden part 22C is hidden under the camera body. The xenon tube 33 and the reflection 34 are arranged in the back of the diffusion plate 22 as shown in FIGS. 3 and 4.

Figure 2:
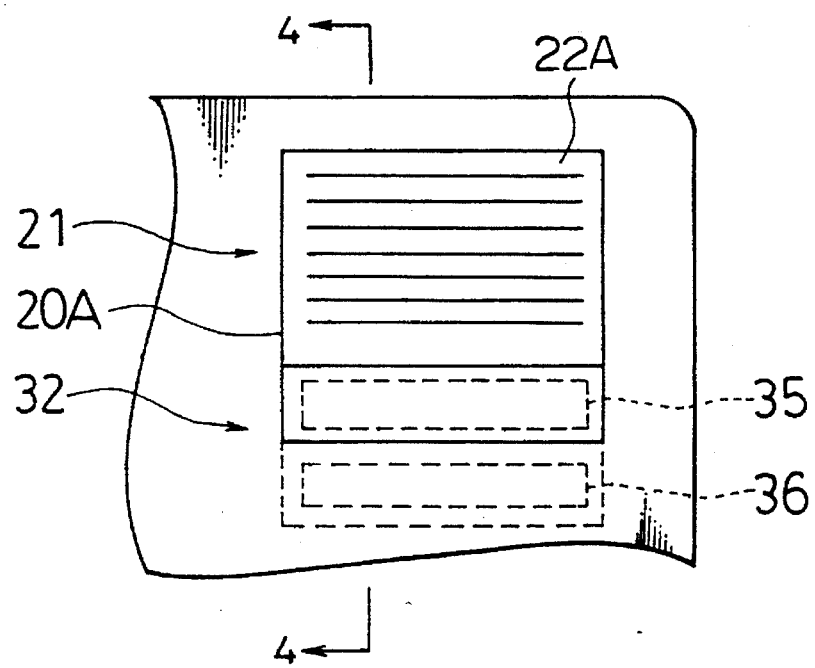
FIG. 2 is an enlarged view illustrating a strobe light emitting part which is applied to a camera according to the present invention.
Figure 3:
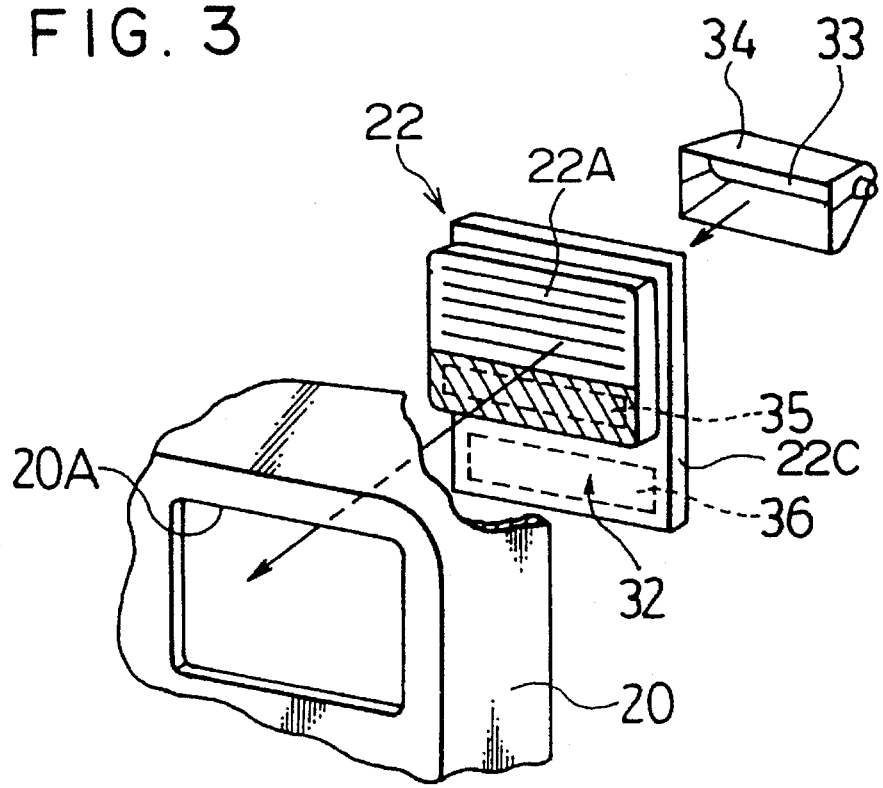
FIG. 3 is a perspective view illustrating the structure in a vicinity of a strobe light emitting part.
Figure 4:
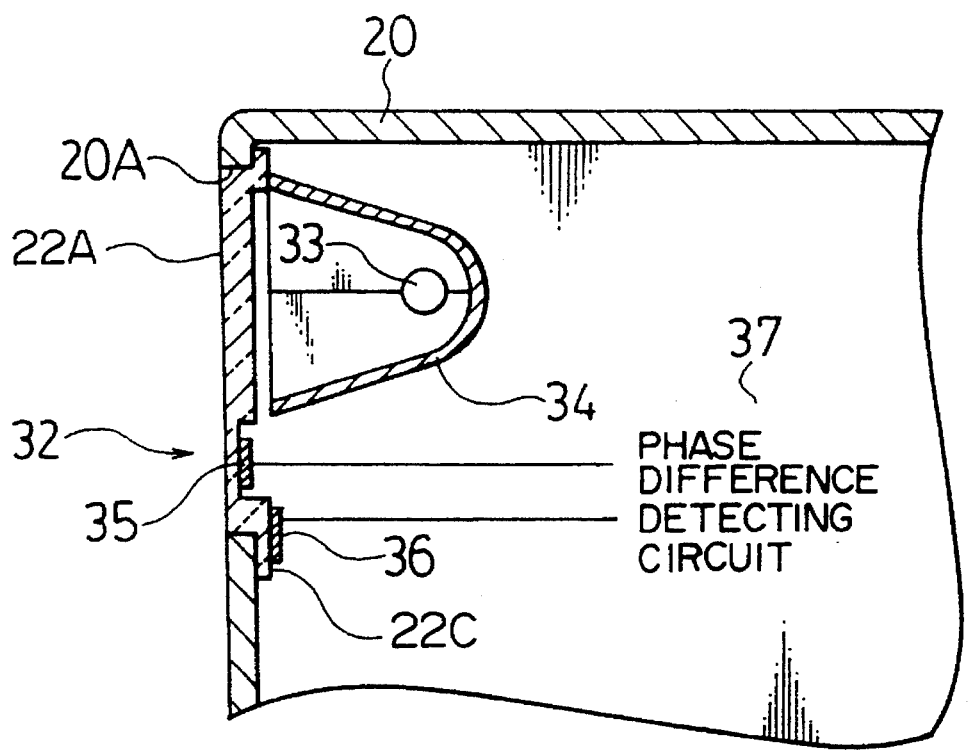
FIG. 4 is a sectional view along a line 4—4 of FIG. 2.
Figure 5:
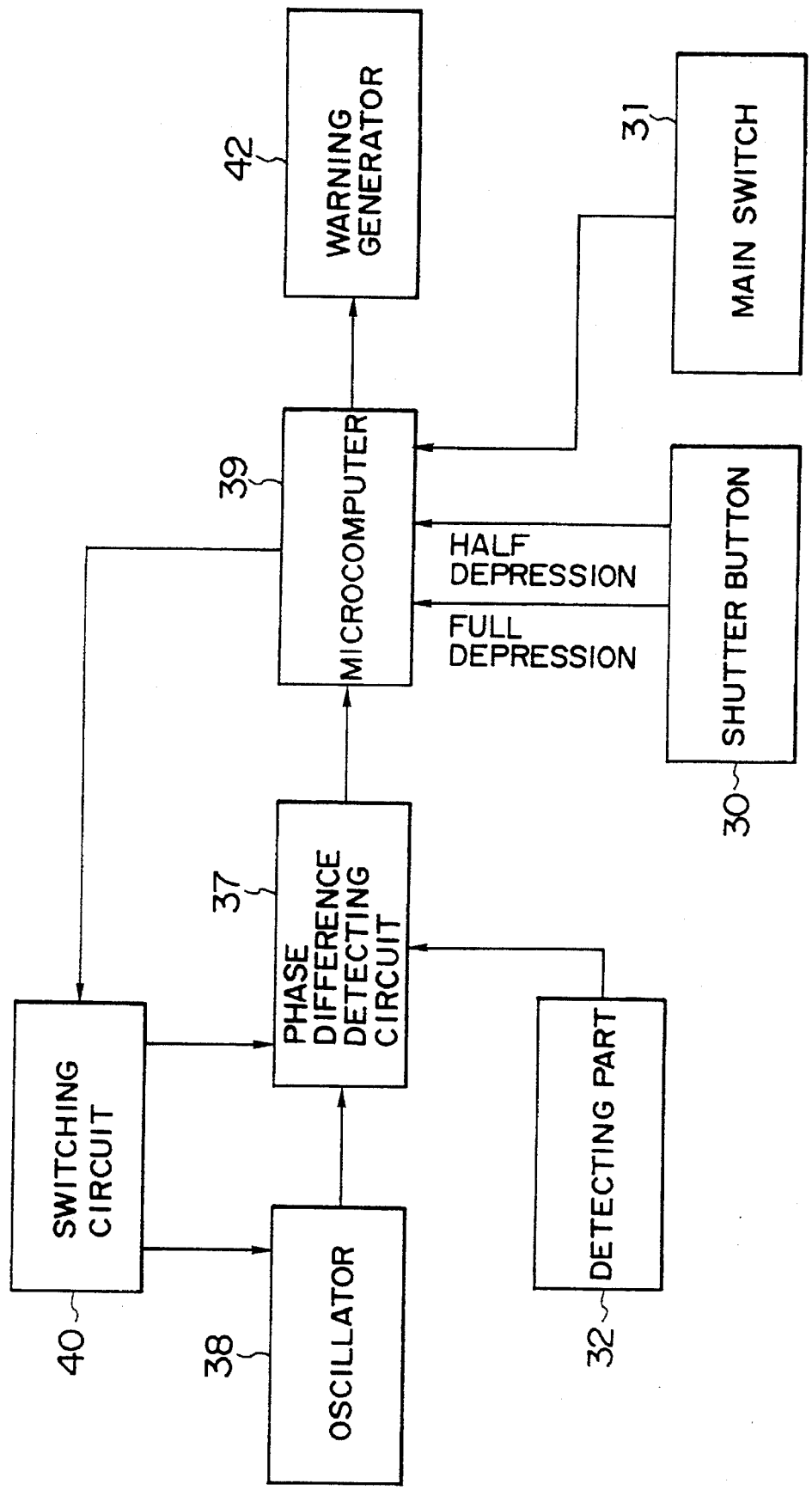
FIG. 5 is a circuit diagram for detecting a finger obstruction which is applied to a camera according to the present invention.

A first electrode 35 is attached at the lower inner part 22B of the exposed part 22A of the diffusion plate 22, and a second electrode 36 is attached to the inner surface of the hidden part 22C as shown in FIGS. 3 and 4 so as to compose a detecting part 32 for detecting the finger obstruction at the strobe light emitting part 21 (refer to FIG. 2). The first electrode 35 and the second electrode 36 are connected to a phase difference detecting circuit 37 of which explanation will be given later.

A circuit for detecting a finger obstruction in this embodiment comprises the detecting part 32, a phase difference detecting circuit 37, an oscillator 38 for generating a high frequency pulse signal, a microcomputer 39 which controls a focusing, a photometry and the like of the camera, a switching circuit 40 which makes the phase difference detecting circuit 37 and the oscillator 38 work in accordance with an instruction from the microcomputer 39, and a warning generator 42 which generates a warning for a finger obstruction at the detecting part 32 (it is provided for the strobe light emitting part 21 in this embodiment) in accordance with an instruction from the microcomputer 39 when the phase difference is detected by the circuit 37. The shutter release button 30 and the main switch 31 are connected with the microcomputer 39. A signal which indicates the half depression of shutter release button 30 for focusing (half depression signal), and a signal which indicates the full depression for shutter releasing (full depression signal) are transmitted to the microcomputer 39.

When the microcomputer receives the half depression signal, it instructs the switching circuit 40 to make the phase difference detecting circuit 37 and the oscillator 38 work. The oscillator 38 generates a high frequency pulse signal having a constant period and send it to the circuit 37 when it working.

Figure 6:
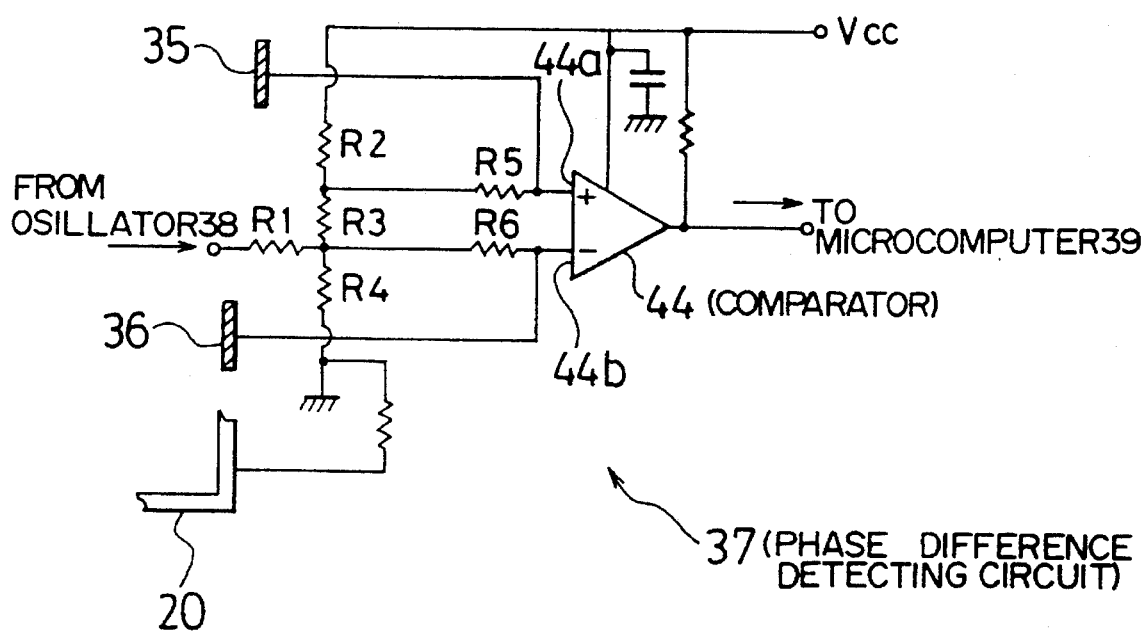
FIG. 6 is a block diagram of a phase difference detecting circuit.

FIG. 6 is a circuit diagram of the phase difference detecting circuit 37. The first and second electrode 35 and 36 are connected with the circuit 37. The detecting circuit 37 detects the phase difference of the high frequency pulse signal in the first electrode side from that in the second electrode side. The first electrode 35 is connected with a positive input terminal 44a of the comparator 44 and the second electrode 36 is connected with a negative input terminal 44b of the comparator 44. A resistance R5 is arranged in a first electrode side and R6 is arranged in a second electrode side. As a result, the electrostatic capacity of the first electrode 35 and the resistance R5 form a delay circuit for the high frequency pulse signal in the first electrode side. Also, the electrostatic capacity of the second electrode 36 and the resistance R6 form a delay circuit for the high frequency pulse signal in the second electrode side. A resistance value of the resistance R6 is appropriately decided in accordance with the electrostatic capacity of the second electrode 36 so that the phase delay of the pulse signal in the second electrode side is equal to or slightly delayed in comparison with the phase delay of the pulse signal in the first electrode side being caused by the electrostatic capacity of the first electrode 35 and the resistance R5. Resistance values of the resistance R1, R2, R3 and R4 are appropriately decided so that the voltage Va of the high frequency pulse signal in the first electrode side at the positive input terminal 44a can be kept slightly higher than the voltage Vb of the high frequency pulse signal in the second electrode side at the negative input terminal 44b (Va>Vb) when nothing touches the camera body 20. The comparator 44 compares the voltage Va with the voltage Vb. In the case that the voltage Va is higher than the voltage Vb (Va>Vb), the comparator 44 sends a H level signal to the microcomputer 39. In the case that the voltage Va is lower than the voltage Vb (Va<Vb), the comparator 44 sends a L level signal to the microcomputer 39. That is, if there is a large phase difference between the pulse signal in the first electrode side and that in the second electrode side, the comparator 44 generates the L level signal. When the microcomputer 39 receives the L level signal, it makes the warning generator 42 work. Then the warning generator 42 turns on (or turns on and off), for example, the LED which is provided within the finder 26 (refer to FIG. 1).

Next, an explanation will be given of a detection of the finger obstruction in the camera which is constructed in the above-mentioned manner.

When the shutter release button 30 is half pressed, the phase difference detecting circuit 37 and the oscillator 38 work, and the high frequency pulse signal having a sharp leading edge is transmitted from the oscillator 38 to the phase difference detecting circuit 37 as shown in FIG. 7(a). As a result, the high frequency pulse signal in the first electrode side is transmitted to the positive input terminal 44a of the comparator 44 via the resistance R5, and the high frequency pulse signal in the second electrode side is transmitted to the negative input terminal 44b of the comparator 44 via the resistance R6.

In the case when the phase difference detecting circuit 37 and the oscillator 38 are working and nothing touches the camera body 20, the waveforms of both of high frequency pulse signals (a change of the voltage Va at the positive input terminal 44a and the voltage Vb at the negative input terminal 44b) are as shown in FIG. 7(b). That is, the leading edges become gentle as for high frequency pulse signal in both sides, and the phases at the time when the voltage Va and the voltage Vb become a peak value are delayed in comparison with an output of the oscillator 38. This is caused by the delay circuit for the high frequency pulse signal in the first electrode side, which comprises the electrostatic capacity of the first electrode 35 and the resistance R5, and the delay circuit for the high frequency pulse signal in the second electrode side, which comprises the electrostatic capacity of the second electrode 36 and the resistance R6. In this case, the voltage Va is kept slightly higher than the voltage Vb, because the phase of the pulse signal in the first electrode side is equal to or slightly delayed in comparison with that in the second electrode side. Therefore, the L level signal is not transmitted, and the warning against the finger obstruction is not generated.

Figure 8A:
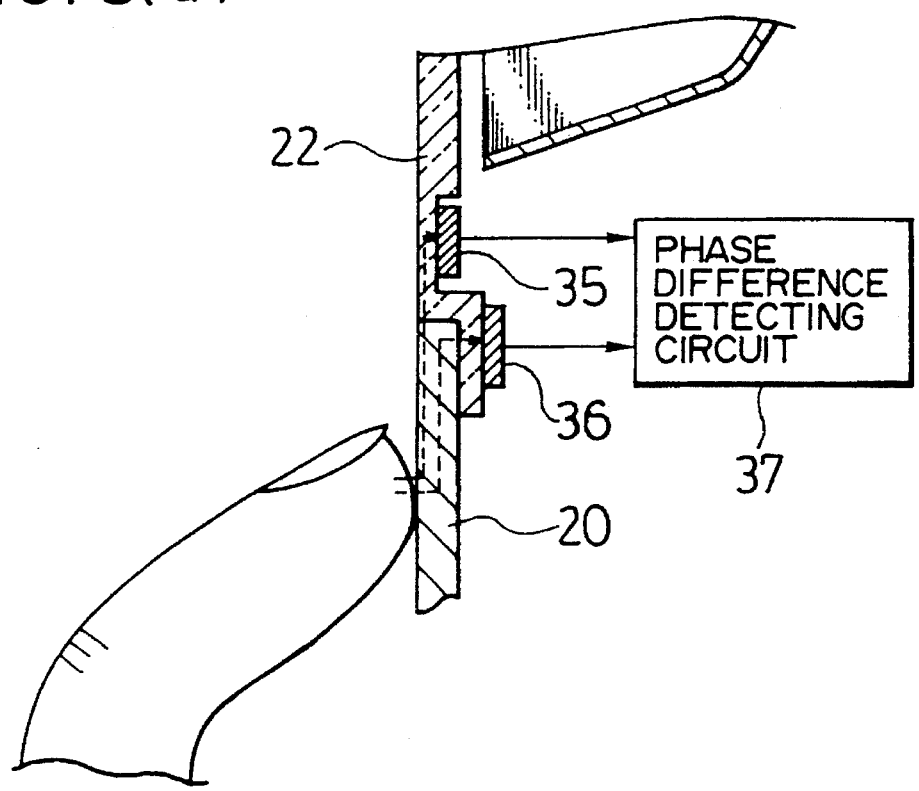
FIGS. 8(a) and 8(b) are explanatory views explaining a finger obstruction.

Next, in the case when the user holds the camera body 20 without obstructing the detecting part 32, the electrostatic capacity of the first and second electrodes 35 and 36 is changed, because the user (his finger) joins as the object which has electrostatic capacity via the camera body 20 and the diffusion plate 22 as shown in FIG. 8(a). As a result, the leading edges become more gentle as for the high frequency pulse signal in the first and second electrode sides, and the phases at the time when the voltage Va and the voltage Vb become a peak value are delayed in comparison with the case of FIG. 7(b). At this time, the electrostatic capacity at the second electrode 36 is equal to or slightly larger than that at the first electrode 35. Therefore, the phase at the time when the voltage Vb become a peak value is equal to the phase at the time when the voltage Va becomes a peak value, or, the former is slightly delayed in comparison with the latter as shown in FIG. 7(c). As a result, the voltage Va is kept slightly higher than the voltage Vb, so the warning against the finger obstruction is not generated.

Figure 8B:
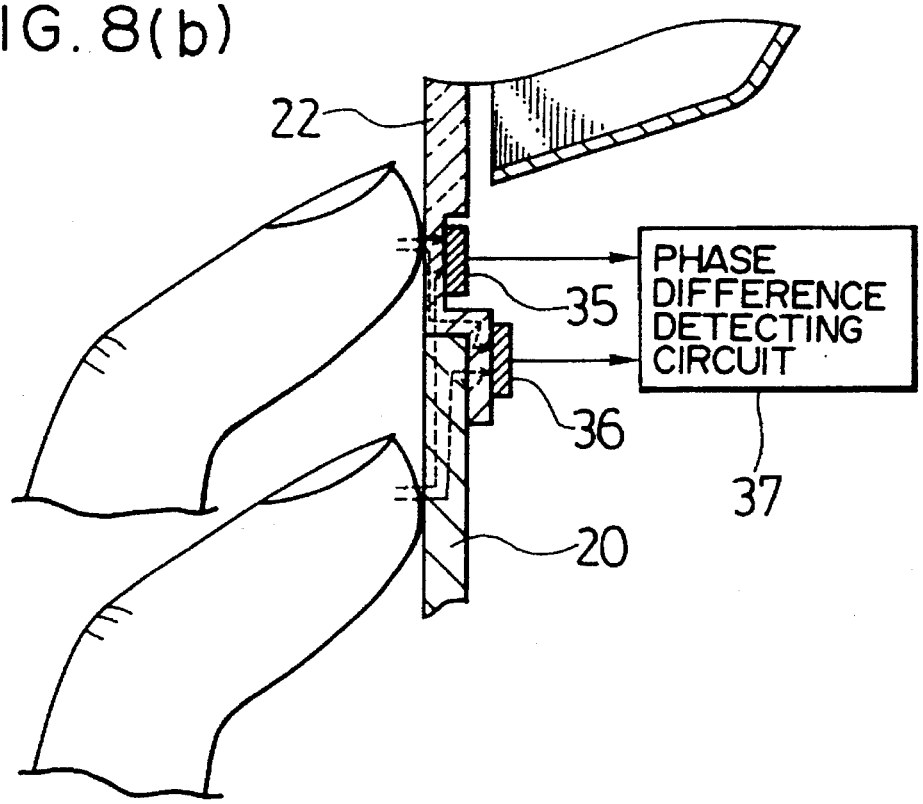

Moreover, in the case when the user holds the camera body 20 with obstructing the exposed part 22A of the diffusion plate 22, the electrostatic capacity of the first and second electrodes 35 and 36 is changed because the user (his finger) joins as the object which has a electrostatic capacity. As shown in FIG. 8(b), there are two routes in which the user's electrostatic capacity gives an effect on the change of the electrode's electrostatic capacity, that is, route 1: user(finger)→diffusion plate 22→electrode route 2: user(finger)→camera body 20→diffusion plate 22 →(electrode).

Here, the camera body 20 exists between the user and the diffusion plate 22 in the route 2, therefore, the change of the electrode's electrostatic capacity is mainly caused by the effect via the route 1. As a result, the effect via the route 2 does not have to be taken into account. Further, comparing the electrostatic capacity change of the first electrode 35 with that of the second electrode 36, the distance of the route 1 for the first electrode 35 is shorter than that of the route 1 for the second electrode 36 (refer to FIG. 8(b)). Therefore, the electrostatic capacity change of the first electrode 35 is given an effect by the electrostatic capacity of the user much more than that of the second electrode 36. That is, the electrostatic capacity at the first electrode 35 is larger than that at the second electrode 36. As a result, the leading edges of the high frequency pulse signal in the first electrode side 35 become more gentle than that in the second electrode 36 side, and the phase at the time when the voltage Va become a peak value is delayed in comparison with the phase at the time when the voltage Vb become a peak value as shown in FIG. 7(d). Accordingly, when the pulse rises, the voltage Va the is lower than the voltage Vb (Va<Vb). As a result, the L level signal is transmitted to the microcomputer, and the warning against the finger obstruction is generated.

As has been described above, in this embodiment, the second electrode is provided in addition to the first electrode 35. Therefore, the finger obstruction can be correctly detected even if the camera body 20 is made of an electroconductive member.

Moreover, in this embodiment, the first electrode 35 and the second electrode 36 are directly attached to the insulating diffusion plate 22. Therefore, the first and second electrodes 35 and 36 can be attached to the camera body 20 only if the diffusion plate 22 is attached to the camera body 20. That is, the first and second electrodes 35 and 36 can be easily attached to the camera body 20.

Figure 9:
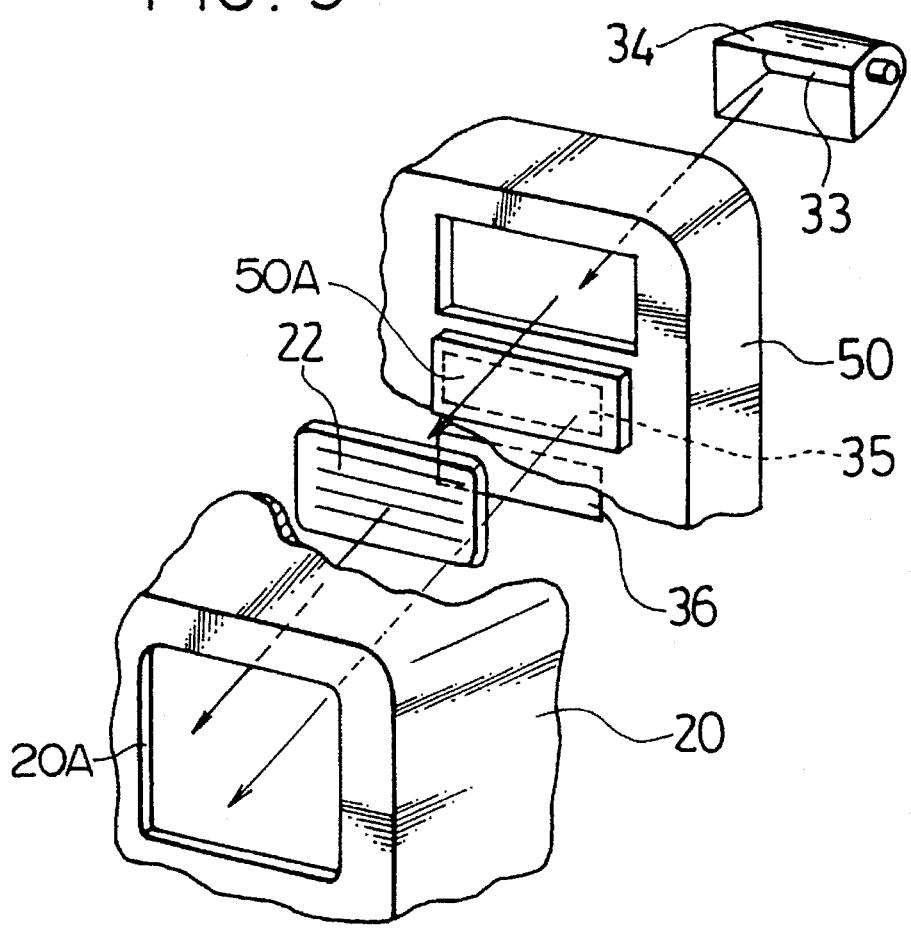
FIG. 9 is a structural view illustrating a strobe light emitting part in the camera according to the second embodiment of the present invention.
Figure 10:
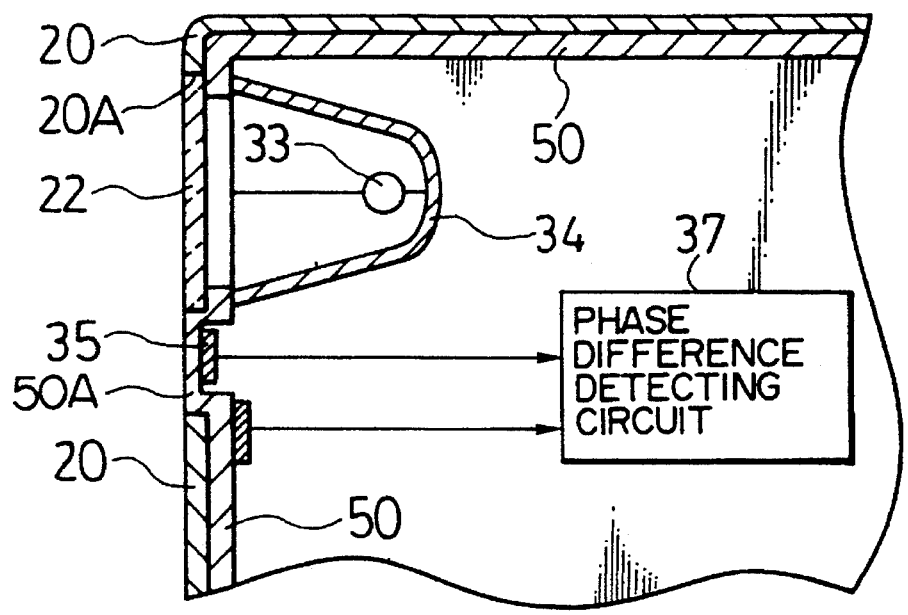
FIG. 10 is a sectional view illustrating a strobe light emitting part in a camera according to the second embodiment of the present invention.

FIG. 9 is a structural view illustrating the essential parts in a vicinity of the strobe light emitting part 21 of the camera according to the second embodiment of the present invention, and FIG. 10 is a sectional view illustrating the strobe light emitting part 21. As shown in these drawings, an inner frame member 50 being made of an insulating material is secured to the inner surface of the camera body 20 so as to eliminate the static electricity in an outside of the camera body 20, which gives no good effect on electric circuits within the camera body 20. The inner frame member 50 includes an exposed part 50A which is exposed via an opening 20A of the camera body 20 below a diffusion plate 22. The first electrode 35 is attached to the back of the exposed part 50A and the second electrode 36 is attached to the inner surface of the inner frame member 50 below the exposed part 50A. As mentioned above, the first and second electrodes 35 and 36 can be easily attached to the camera body 20 only if the inner frame member 50 is secured to the camera body 20.

Figure 11:
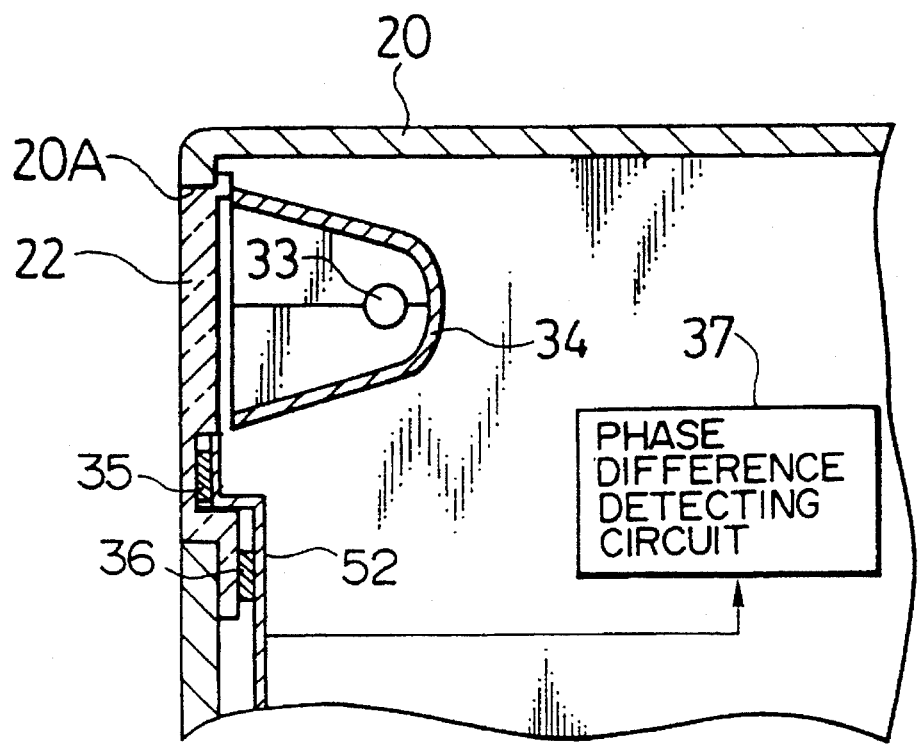
FIG. 11 is a sectional view illustrating a strobe light emitting part in a camera according to the third embodiment of the present invention; and, FIG. 12 is an explanatory view explaining a flexible printed circuit board which is applied to the third embodiment of the present invention.
Figure 12:
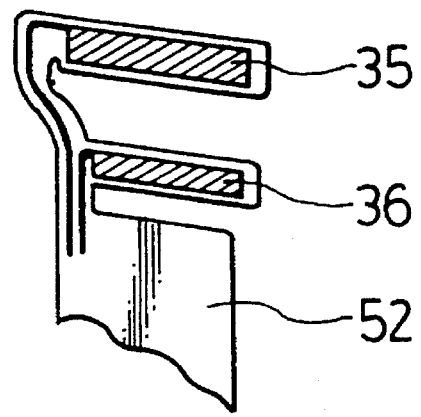

FIG. 11 is a sectional view in a vicinity of the strobe light emitting part 21 of the camera according to the third embodiment of the present invention. As shown in the drawing, the first and second electrodes 35 and 36 are attached to the flexible printed circuit board 52 of FIG. 12 to be integrated with each other. Therefore, the first and second electrodes 35 and 36 are easily attached in the camera body 20. In this case, the electrodes 35 and 36 are engaged with the diffusion plate 22 and are fixed with an adhesive.

In the above-described embodiments, the means for detecting the finger obstruction is applied to the strobe light emitting part 21. However the present invention is not limited to this. That is, the detecting means can be also applied to transparent plates (covering member) 23A, 24A, and 25A which cover each of the light-projection window 23 and the light intake window 24 for automatic focusing, and the photometric window 25 for measuring a subject brightness. Otherwise, it is also applicable to the transparent plate 26A covering the opening of the finder 26 and the taking lens 28.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera having a camera body being made of an electro-conductive material and at least one window for light-projection and/or a light intake thereon, comprising:

a first electrode which is attached to a first insulating member being provided in said window or in a vicinity of said window in such a manner that said first electrode is located inside said camera body;

a second electrode which is attached to a second insulating member being provided on an inner surface of said camera body in such a manner that said second electrode is located in a vicinity of said first electrode;

detecting means for detecting a finger obstruction by comparing electrostatic capacity at said first electrode with an electrostatic capacity at said second electrode relatively; and warning generating means for generating a warning when said detecting means detects a finger obstruction.

2. The camera according to claim 1 wherein, said detecting means comprises:

pulse generating means;

first delaying means for delaying a pulse being generated by said pulse generating means in accordance with an electrostatic capacity at said first electrode;

second delaying means for delaying a pulse being generated by said pulse generating means in accordance with electrostatic capacity at said second electrode;

means for detecting a finger obstruction in accordance with a phase difference of a pulse being outputted from said first delaying means from a pulse being outputted from said second delaying means.

3. The camera according to claim 2, wherein said first insulating member and said second insulating member are integrated in a covering member for said window, which is made of an insulating material.

4. The camera according to claim 3, wherein said covering member includes an exposed part which is exposed toward an outside of said camera body from said window and a hidden part which is located in an inside of said camera body, and said first electrode is attached to said exposed part and said second electrode is attached to said hidden part.

5. The camera according to claim 4, wherein, said window is a window for a strobe light emitting part and said covering member is a diffusion plate for a strobe light emitting part.

6. The camera according to claim 4, wherein said window is a light-projection window for automatic focusing and said covering member is a transparent plate which covers said light-projection window for automatic focusing.

7. The camera according to claim 4, wherein said window is a light intake window for automatic focusing and said covering member is a transparent plate which covers said light intake window for automatic focusing.

8. The camera according to claim 4, wherein said window is a photometric window for measuring a subject brightness and said covering member is a transparent plate which covers said photometric window for measuring a subject brightness.

9. The camera according to claim 4, wherein said window is a finder opening and said covering member is a transparent plate which covers said finder opening.

10. The camera according to claim 4, wherein said covering member is a taking lens.

11. The camera according to claim 1, wherein said first insulating member and said second insulating member are integrated in an insulating inner frame member which is secured to an inner surface of said camera body.

12. The camera according to claim 11, wherein, said insulating inner frame member includes an exposed part which is exposed toward an outside of said camera body from said window and said first electrode is attached to an inside of said exposed part, and said second electrode is attached to an inner surface of said insulating inner frame member in a vicinity of said exposed part.

13. The camera according to claim 1, wherein, said first electrode and said second electrode are integrated in a flexible printed circuit board.

* * * * *